United States Patent [19]

Yanagiuchi et al.

[11] Patent Number: 4,637,270

[45] Date of Patent: Jan. 20, 1987

[54] ARRANGEMENT FOR GOVERNING VEHICLE ENGINE SPEED RESPONSIVE TO ACTUAL RUNNING SPEED OF THE VEHICLE

[75] Inventors: Noboru Yanagiuchi, Kobe; Shigeo Adachi, Akashi; Masatoshi Inoue, Himeji; Hiroshi Takata, Hyogo; Toyoshi Matsuda, Kakogawa, all of Japan

[73] Assignee: Kawasaki Jukogyo Kabushiki Kaisha, Japan

[21] Appl. No.: 722,450

[22] Filed: Apr. 12, 1985

[30] Foreign Application Priority Data

Apr. 16, 1984 [JP] Japan .............................. 59-56187[U]

[51] Int. Cl.⁴ ............................................. F16H 5/46
[52] U.S. Cl. ..................................... 74/336.5; 74/857
[58] Field of Search ............................... 74/857, 336.5

[56] References Cited

U.S. PATENT DOCUMENTS 2,609,900  9/1952  Neracher et al. .............. 74/336.5 X
2,874,585  2/1959  Lasley .................. 74/336.5
2,994,233  8/1961  Gerard .................. 74/336.5 X

FOREIGN PATENT DOCUMENTS 1286863   1/1969   Fed. Rep. of Germany ........ 74/860
751612    9/1933   France ................. 74/336.5
73136     9/1960   France ................. 74/336.5
52-129893 10/1977  Japan .
1051741   12/1966  United Kingdom ............... 74/336.5

Primary Examiner—Lawrence Staab
Assistant Examiner—D. Wright
Attorney, Agent, or Firm—Leydig, Voit & Mayer

[57] ABSTRACT

A governor device for a vehicle having a speed detecting device adapted for detecting the speed of the input shaft of a transmission which is adapted to conduct a shift between power transmitting stage and neutral stage. The input shaft of the transmission is connected to the engine through an automatic stepless speed changer. The speed detecting means may be, for example, a centrifugal governor device meshing with the input shaft of the transmission.

4 Claims, 1 Drawing Figure

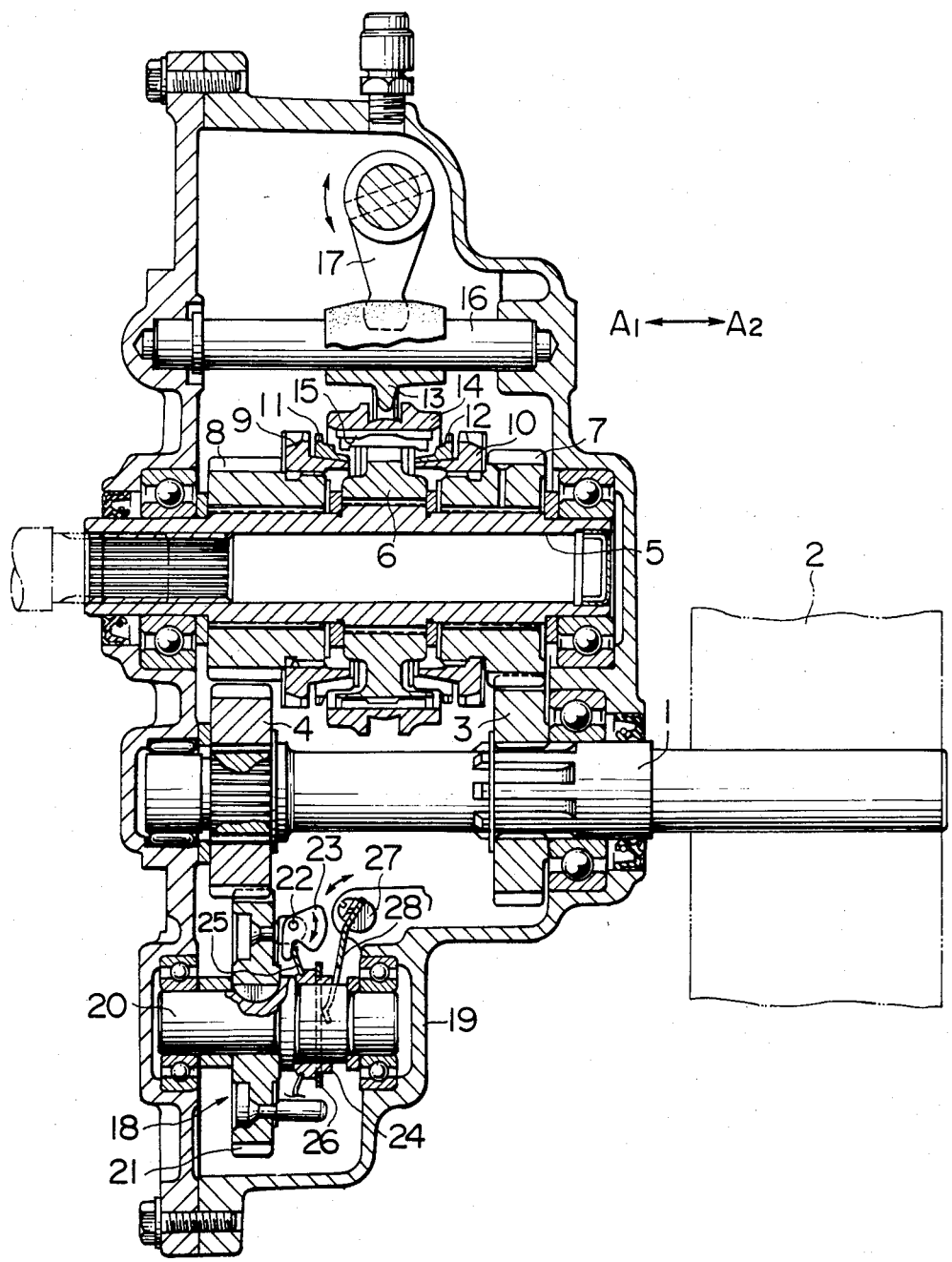

ARRANGEMENT FOR GOVERNING VEHICLE ENGINE SPEED RESPONSIVE TO ACTUAL RUNNING SPEED OF THE VEHICLE

BACKGROUND OF THE INVENTION

1. Field of the Invention

The present invention relates to the governing of engine speed of vehicles.

2. Description of the Background Art

In a vehicle such as a "golf cart", the input shaft of a manual shift transmission and the output shaft of an engine are connected to each other through an automatic stepless speed changer, so that when the vehicle climbs a hill the speed of the input shaft of the transmission is automatically reduced and the torque is increased.

On the other hand, circumstances often require a limitation of the maximum speed of the vehicle of the kind described during running on a flat road or ground. To meet this requirement, Japanese Utility Model Laid-Open No. 129893/1977 proposes a governor device which is directly connected to the crankshaft of the engine. This governor arrangement encounters the following problem. In climbing a hill, the speed of the vehicle is automatically reduced by the automatic stepless speed changer and the torque of the wheel shaft is increased. When the higher speed of the vehicle is required in climbing the hill, the throttle of the engine is opened to increase the speed of the engine. However, even where the throttle of the engine is intended to be fully opened, the maximum speed of the engine may not exceed the predetermined maximum speed which is limited by the governor device, a possibility of suffering this disadvantage depending upon the characteristics of the automatic stepless speed changer. Namely, when the throttle is fully opened, the speed of the engine exceeds the predetermined maximum speed, and the governor device acts to partially close the throttle. Accordingly, since the speed of the vehicle is automatically reduced by the speed changer in climbing the hill, the hill climbing speed of the vehicle is lower than the running speed on the flat road. In other words, in some cases, the power or ability of the engine is not fully utilized during hill climbing.

SUMMARY OF THE INVENTION

Accordingly, an object of the invention is to provide an arrangement for governing engine speed of vehicles capable of effectively preventing any reduction of the actual running speed during hill climbing and overrunning of the engine in the neutral stage and having a compact construction well protected from dust.

To this end, according to the invention, there is provided a governor device for vehicles having a transmission capable of conducting a shift between the power transmitting condition and a neutral condition and an automatic stepless speed changer through which the input shaft of the transmission is drivingly connected to the output shaft of an engine, the governor device comprising a speed detecting means adapted for detecting the speed of the input shaft and a controller for controlling an output of the engine in accordance with the output of the speed detecting means.

According to the invention, since the governor device operates in response to the speed of the input shaft of the transmission, and thus in response to the speed of the ground wheels when the vehicle is being driven and not in response to the speed of the engine, it is possible to avoid any reduction in the speed of the engine during hill climbing, i.e., to make the full use of the power of the engine during hill climbing. In addition, this governor arrangement can prevent overrunning of the engine in the neutral stage, as in the case of the conventional governor device directly connected to the crankshaft of the engine.

In other words, since the input shaft of the transmission is connected mechanically to the output shaft of the transmission through gears in the forward and reverse stages, the governor device can detect the actual running speed of the vechicle. In addition, the governor device can also detect the engine speed through the automatic stepless speed changer in the neutral stage. Thus, the governor device of the invention has an optimum position for controlling the engine throttle in all the forward, reverse and neutral stages.

It is to be noted also that the maintenance of the engine and transmission, as well as the tune-up of the engine, is facilitated. In addition, since the speed detecting means is provided within the transmission case, the speed detecting means is protected from dust and the construction as a whole is made compact.

BRIEF DESCRIPTION OF THE DRAWINGS

The attached sole FIGURE is a sectional side elevational view of a transmission incorporating an embodiment of a vehicle governor device of the invention.

DESCRIPTION OF THE PREFERRED EMBODIMENT

The attached FIGURE is a sectional view of a transmission which is adapted to conduct a shift between the forward, the reverse and the neutral stages. The transmission has an input shaft 1 which is drivingly connected to the output shaft of an engine (not shown) through an automatic stepless speed changer 2 of V-belt type. A forward input gear 3 and a reverse input gear 4 are splined to the input shaft 1. The transmission also has an output shaft 5 to which is splined a hub 6. A forward output gear 7 and a reverse output gear 8 are rotatably supported by the output shaft 5 at both sides of the hub 6. The forward output gear 7 always meshes with the forward input gear 3, while the reverse output gear 8 always meshes with the reverse input gear 4 through an idler gear (not shown). First dog gears 9 and 10 are splined to the forward output gear 7 and the reverse output gear 8, respectively. Second dog gears 11 and 12 are loosely mounted on the peripheries of the first dog gears 9 and 10 for friction engagement therewith. A sleeve 14 is adapted to be shifted in the directions of arrows $A_1$ and $A_2$ by the action of a change arm 13. The sleeve 14 is splined to the hub 6 so that it can move axially relatively to the hub 6. A reference numeral 16 denotes a supporting shaft for the change arm 13, while 17 denotes a driving lever for the change arm 13.

A reference numeral 18 designates a speed detecting means for a centrifugal governor device. The speed detecting means 18 is constituted by parts such as a main shaft 20 mounted in the transmission case 19, a driven gear 21 fixed to the main shaft 20 and meshing with the reverse drive gear 4, a weight 23 pivotally supported by a supporting shaft 22 on one side of the driven gear 21, a sleeve 24 axialy movably supported by the main shaft 20, two engaging rings 25, 26 provided on the sleeve 24, and an arm 28 which is secured to a rotary shaft 27. The arm 28 is adapted to act on one of the engaging rings 26 such as to cause the other engaging ring 25 to engage with the weight 23. The rotary shaft 27 for the arm 28 is supported by the transmission case 19 and is connected to a throttle valve (not shown).

In operation, rotation of the input shaft 1 is transmitted to the forward output gear 7 through the forward input gear 3 and also to the reverse output gear 8 through the reverse input gear 4. If the sleeve 14 takes the neutral position as illustrated, the forward output gear 7 and the reverse output gear 8 idle with respect to the output shaft 5. When the change arm 13 is operated to shift the sleeve 14 to the right as viewed in the FIGURE, the sleeve 14 is brought into engagement with the second dog gear 12, first dog gear 10 and the forward output gear 7 successively, so that the torque of the output gear 7 is transmitted to the output shaft 5 through the sleeve 14 and the hub 6. Conversely, when the sleeve 14 is shifted to the left as viewed in the drawing, the sleeve 14 is brought into engagement with the other second dog gear 11, first dog gear 9 and the reverse output gear 8, so that the torque of the reverse input gear 4 is transmitted to the output shaft 5 through the idler gear (not shown), reverse output gear 8, sleeve 14 and the hub 6. It will be seen that the direction of rotation is reversed in this case because the torque transmission is made through the idler gear.

The rotation of the input shaft 1 causes also a rotation of the driven gear 21 of the governor device through the reverse input gear 4. As the engine speed is increased, the centrifugal force acting on the weight 23 is increased, so that it is swung outwardly about the pivot shaft 22, such as to displace the sleeve 24 to the right as viewed in the drawings through the action of the engaging ring 25. As a result, the end of the arm 28 is pushed by the engaging ring 26 on the sleeve 24 so that the rotary shaft 27 rotates. The maximum opening degree of the throttle, i.e., the maximum speeds of the engine, in the forward driving, reverse driving and the neutral stages is determined by the angle of rotation of the rotary shaft 27.

When the vehicle climbs a hill, the automatic speed changer 2 automatically reduces the speed of the input shaft 1. However, since the speed detecting means 18 of the governor device is associated with the input shaft 1, the speed of the engine is increased to a level higher than that obtained during running of the vehicle on the levelled ground, as the driver operates the throttle for the full throttle opening. This in turn compensates for any reduction in the speed of the input shaft 1, thus preventing the reduction in the vehicle speed during hill climbing.

In the arrangement described above, the speed detecting means 18 of the governor device is arranged to detect the speed of the input shaft 1 of the transmission rather than the speed of the output shaft 5, so that the overrunning of the engine in the neutral stage is avoided as in the case of the conventional case where the speed detecting means is arranged for detecting the speed of the crankshaft of the engine. In addition, since the speed detecting means 18 is disposed in the transmission case 19 and covered by the latter, it is protected against dust and the construction of the whole system is made compact advantageously.

Although the invention has been described through specific terms, it is to be noted here that the described embodiment is not exclusive and various changes and modifications may be imparted thereto. For instance, the speed detecting means 18 for detecting the speed of the input shaft 1 may be connected to the forward input gear 3 or the reverse input gear 4. It is also possible to use an electric rotation speed pick-up in place of the mechanical speed detecting means 18 used in the described embodiment. Other changes and modifications are still possible without departing from the scope of the invention which is limited solely by the appended claims.

What is claimed is:

1. In combination:
   a vehicle engine having an output shaft,
   a transmission capable of conducting a shift between a power transmitting stage and a neutral stage and having an input shaft,
   an automatic stepless speed changer connecting said input shaft of said transmission to said output shaft of said engine,
   a governor device comprising a rotational speed detecting means for producing an output corresponding to speed of said input shaft of the transmission, and
   a control means for controlling an output of said engine in accordance with the output of said speed detecting means.

2. The combination according to claim 1 wherein said speed detecting means is provided in a case of said transmission.

3. The combination according to claim 2 wherein said speed detecting means is of a centrifugal type.

4. The combination according to claim 3 wherein said speed detecting means includes:
   a main shaft rotatably mounted in said case of said transmission;
   a driven gear fixed to said main shaft and meshing with a gear fixed to the input shaft of said transmission;
   a supporting shaft provided on one side of said driven gear;
   a weight pivotally supported by said supporting shaft;
   a sleeve mounted on said main shaft for movement in an axial direction;
   a first engaging ring fixed to said sleeve and contacting said weight; and
   a second engaging ring fixed to said sleeve;
   and said control means includes:
   a rotary shaft rotatably mounted in the transmission case and connected to a throttle valve of said engine; and
   an arm fixed to said rotary shaft and contacting said second engaging ring;
   whereby the swinging of said weight is transmitted to said rotary shaft.

* * * * *